(12) United States Patent
Takeda (10) Patent No.: US 7,934,043 B2
(45) Date of Patent: Apr. 26, 2011

(54) DATA PROCESSING APPARATUS FOR CONTROLLING ACCESS TO A MEMORY BASED UPON DETECTION OF COMPLETION OF A DMA BUS CYCLE

(75) Inventor: Kenichi Takeda, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 707 days.

(21) Appl. No.: 11/882,855

(22) Filed: Aug. 6, 2007

(65) Prior Publication Data

US 2008/0040530 A1 Feb. 14, 2008

(30) Foreign Application Priority Data

Aug. 8, 2006 (JP) ................................. 2006-216144

(51) Int. Cl.
*G06F 13/00* (2006.01)
(52) U.S. Cl. .............. 710/309; 710/22; 710/26; 710/28; 711/146
(58) Field of Classification Search .................... 710/22, 710/26, 28, 306, 309, 310; 711/146
See application file for complete search history.

(56) References Cited

U.S. PATENT DOCUMENTS

| 5,119,485 | A | * | 6/1992 | Ledbetter et al. ............. 711/146 |
| 6,345,320 | B1 | * | 2/2002 | Kawamata et al. ............. 710/22 |
| 6,748,463 | B1 | * | 6/2004 | Tsuboi et al. .................... 710/22 |
| 6,829,665 | B2 | * | 12/2004 | Jones et al. .................... 710/107 |
| 7,043,612 | B2 | * | 5/2006 | Myers ........................... 711/158 |
| 2005/0091458 | A1 | * | 4/2005 | Sato et al. .................... 711/138 |
| 2008/0040530 | A1 | * | 2/2008 | Takeda ......................... 710/308 |

FOREIGN PATENT DOCUMENTS

JP   06-231032   8/1994
JP   2001-134467   5/2001

* cited by examiner

*Primary Examiner* — Glenn A Auve
(74) *Attorney, Agent, or Firm* — McGinn IP Law Group, PLLC (57) ABSTRACT

A data processing apparatus contains a first bus connected to a first memory, a first central processing unit (CPU) being accessible to the first memory via the first bus, a first Direct Memory Access (DMA) controller being accessible to the first memory via the first bus, and a monitor circuit connected to the first bus and monitoring addresses transferred on the first bus. The addresses transferred on the first bus are transmitted from the first DMA controller to the first memory via the first bus. The monitor circuit compares the address transferred on the first bus with a preset monitor target address. The CPU acquires the comparison results by the monitor circuit. If the comparison results show an address match, then the CPU accesses the first memory. The CPU can in this way access the first memory at a correct timing.

20 Claims, 9 Drawing Sheets

| 21: BIT NO. | 7 | 6 | 5 | 4 | 3 | 2 | 1 | 0 |
|---|---|---|---|---|---|---|---|---|
| 22: STATUS | 0 | 0 | 1 | 0 | 1 | 0 | 0 | 1 |

FIG. 6B

| 21: BIT NO. | 7 | 6 | 5 | 4 | 3 | 2 | 1 | 0 |
|---|---|---|---|---|---|---|---|---|
| 22: STATUS | 0 | 0 | 1 | 0 | 1 | 0 | 0 | 1 |
| 23: ENABLE FLAG | 1 | 1 | 1 | 1 | 0 | 0 | 0 | 0 |
| 24: STATUS AND FLAG | 0 | 0 | 1 | 0 | 0 | 0 | 0 | 0 |

DATA PROCESSING APPARATUS FOR CONTROLLING ACCESS TO A MEMORY BASED UPON DETECTION OF COMPLETION OF A DMA BUS CYCLE

BACKGROUND OF THE INVENTION

1. Field of the Invention

This invention relates to a data processing apparatus for controlling access to a memory by a central processing unit (CPU).

2. Description of the Related Art

One method for transferring data within a computer system utilizes Direct Memory Access (DMA) transfer for directly sending data between each device (for example, Input/Output (I/O) devices) and a memory (for example, a Random Access Memory (RAM)) without transiting through the CPU. The term, DMA transfer as used here, refers to the operation from reading of data from each device, to the writing of that data into a memory within the system. Moreover, the operation of writing data into a memory within the system by DMA transfer is hereafter referred to as DMA write. A DMA controller (hereafter called DMAC) controls the DMA transfer. A bus arbiter mediates the buses utilized in DMA transfer. The CPU can therefore access regions other than memory regions being used for DMA transfer and can execute other processing during DMA transfer. The CPU for example can access regions other than the DMA transfer destination address and execute other processing while data sent from an I/O device via DMA transfer is being written into a memory. When reading data sent via DMA transfer, the CPU can access the DMA transfer destination address after checking that DMA transfer has been completed, and read the data (hereafter called, CPU Read) that was written into the memory via DMA transfer. In this case, the CPU of the prior art can check that DMA transfer is complete, by a DMAC making an interrupt to the CPU.

However, execution of the interrupt processing routine has become faster in recent years due to improved CPU processing speeds. The data transfer speed of data transfer units however, has not drastically improved to keep pace with the multiple functions of integrated circuits. The CPU might therefore sometimes access the DMA write destination address in the applicable memory and read data, before data can be written by DMA write. In that case, the CPU reads the (old) data from the memory before the (new) data has been written by DMA write.

One technology for resolving this type of problem is disclosed in JP-A 6(1994)-231023. In the method described in JP-A No. 231023/1995, an access control device temporarily stores the address of the DMA transfer destination in a buffer, compares that address with an address sent during CPU access, and control the reading by the CPU based on these comparison results.

Figure 8:
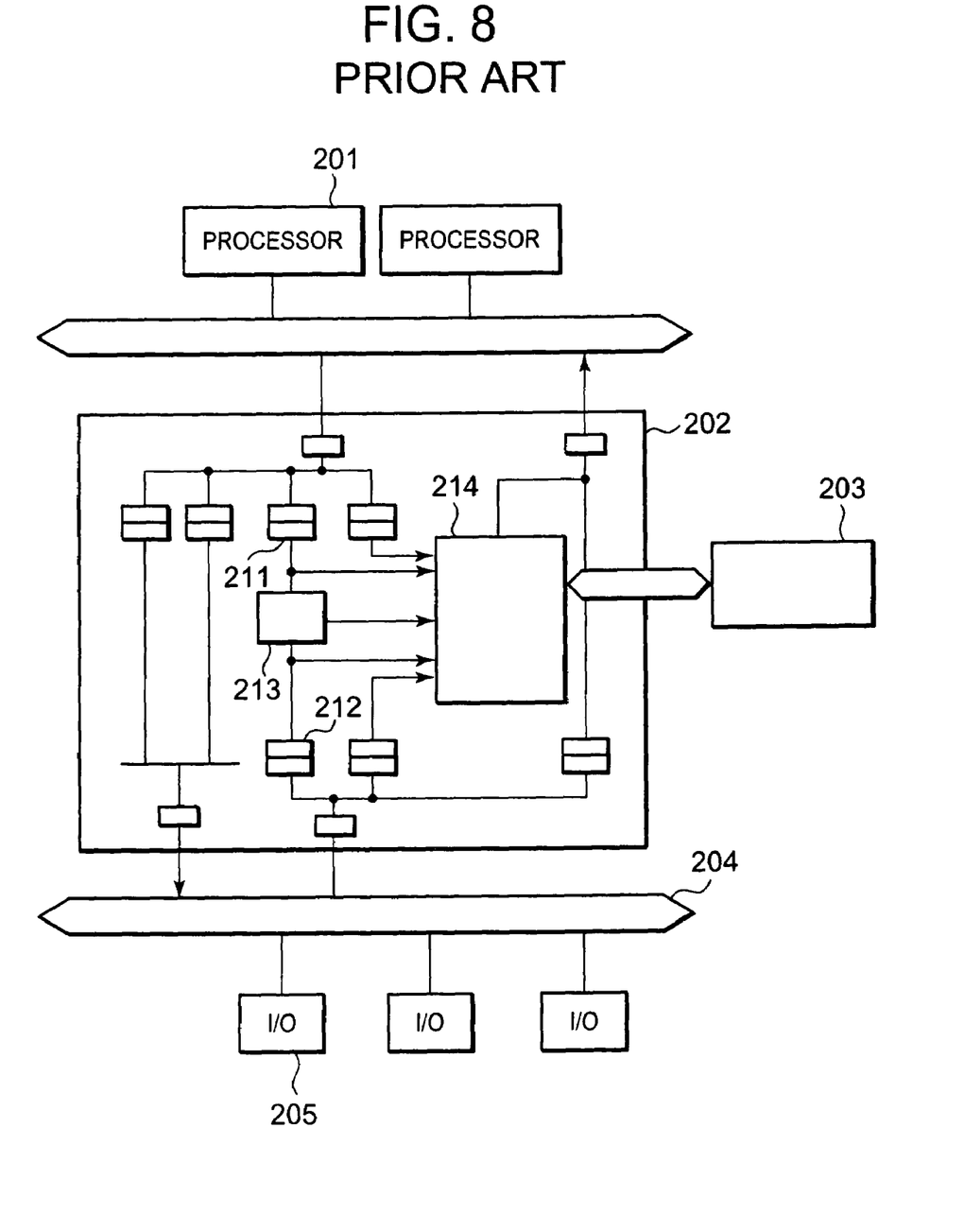
FIG. 8 is a block diagram showing the internal structure of the access control device and the system structure of the system utilizing the access control device of the technology of the prior art.

FIG. 8 is a block diagram showing the internal structure of the access control device 202 and the system structure of a system using the access control device 202 as disclosed in JP-A No. 231023/1995. The access control device 202 is installed between the processor 201 and the I/O device 205 as shown in FIG. 8. A buffer 212 stores the address data of the transfer destination during DMA transfer (write) onto the main memory device 203 from the I/O device 205. A buffer 211 stores the address data of the read destination when the processor 201 is accessing (reading) the main memory device 203.

The access control device 202 includes a comparator 213 for comparing the address within the buffer 212 with the address within the buffer 211 and, an access control unit 214 for controlling the CPU read process according to the results from the comparator 213. The comparator 213 here compares all entries in the buffer 212, with entries from the earliest string in the buffer 211 (next entries to be output). If both addresses are same, then the access control unit 214 stops the CPU access to prevent it from overtaking the DMA transfer.

Technology for acquiring information from an internal bus on the other hand, is disclosed in JP-A 2001-134467.

The present inventor has recognized that in the technology disclosed in JP-A 6(1994)-231023, the CPU accessing of the memory device might overtake the DMA (transfer) when the DMA transfer is performed via buses in a hierarchical structure using bus bridges. In the structure shown in FIG. 8 where another bus is connected by a bus bridge to the bus 204, the case is described where an I/O device connected to another bus is performing DMA transfer to the main memory device 203 via the bus bridge. Usually a buffer (first-in/first-out (FIFO) buffer) is installed on bus bridges connecting between buses to allow smooth data transfer between buses operating at different transfer speeds. In this case, arrival at the buffer 212 of address data sent for DMA transfer from I/O devices is delayed due to being held in the buffer within the bus bridge.

The read address data from the processor 201 might be input to the buffer 211 earlier than the address data for DMA write onto the main memory device 203 arrives at the buffer 212, so that the access control unit 214 cannot stop access from the processor 201. The present inventor therefore took note of the fact that the technology disclosed in JP-A No. 231023/1995 has the problem that the possibility of access from the CPU overtaking the DMA transfer data writing still remains during DMA transfer executed via a structure including buffers (delay elements) such as bus bridges. The buffer within the bus bridge also utilizes the FIFO method and the size of that buffer is usually set based on the timing and difference in the input/output speed of the data being handled. The present inventor also noticed that the possibility of reading by the CPU occurring faster (overtaking) than DMA write, increases when the buffer is large.

SUMMARY

The present invention seeks to solve one or more of the above problems or to improve upon those problems at least in part.

In one embodiment, a data processing apparatus includes a first bus connected to a first memory, and a first CPU being accessible to the first memory via the first bus, and a first DMA controller being accessible to the first memory via the first bus, and a monitor circuit connected to the first bus and monitoring addresses transferred on the first bus. The addresses transferred on the first bus are transmitted from the first DMA controller to the first memory via the first bus. The first CPU accesses the first memory based on monitoring results by the monitor circuit. The monitor circuit in the data processing apparatus with this type of structure can find the first memory access situation of the first DMA controller by monitoring the addresses transferred on the first bus that is connected to the first memory. The first CPU can access the first memory at a correct timing since it accesses the first memory based on monitoring results by the monitor circuit.

In another embodiment, a data processing apparatus includes a first bus, and a DMA controller coupled to the first bus and operative to perform a DMA bus cycle on the first bus, and a CPU coupled to the first bus and operative to perform a CPU bus cycle on the first bus, and a monitor circuit coupled to the first bus and temporarily storing target address information to produce access information indicating that address information appearing on the first bus based on the DMA bus cycle is equal to the target address information, and the CPU being granted to perform the CPU bus cycle when the access information is produced. The monitor circuit in the data processing apparatus with this type of structure can find a situation of the DMA bus cycle to access a first memory coupled to the first bus. The CPU can access the first memory at a correct timing since it accesses the first memory based on the access information of the monitor circuit.

BRIEF DESCRIPTION OF THE DRAWINGS

The above and other objects, advantages and features of the present invention will become more apparent from the following description of certain preferred embodiments taken in conjunction with the accompanying drawings in which.

DETAILED DESCRIPTION OF THE PREFERRED EMBODIMENTS

The invention will now be described herein with reference to the illustrative embodiments. Those skilled in the art will recognize that many alternative embodiments can be accomplished using the teachings of the present invention and that the invention is not limited to these embodiments illustrated for explanatory purposes. The same or similar reference numerals in the drawings indicate the same, similar, or equivalent structural elements. If additional numerals are attached in multiple similar structures and described as a general term, then a description is given without the additional numeral. Hereafter, the data processing apparatus serving as the example in the embodiment describes a microcomputer on which are mounted a memory (for example, a RAM) and a CPU mutually connected by an internal bus.

First Embodiment

The microcomputer of the first embodiment of this invention is described next while referring to FIG. 1 through FIG. 3B. In the first embodiment, a microcomputer 100A includes a monitor circuit 10A for monitoring the address transmitted over the bus, and for controlling access to the first memory 3 of the CPU 1 based on the monitoring results. When the monitor circuit 10A detects an address on the first bus 5 matching the monitor target address (target address 101), it gives access permission to the CPU 1. In response to being allowed access, the CPU 1 accesses the first memory 3.

Structure

Figure 1:
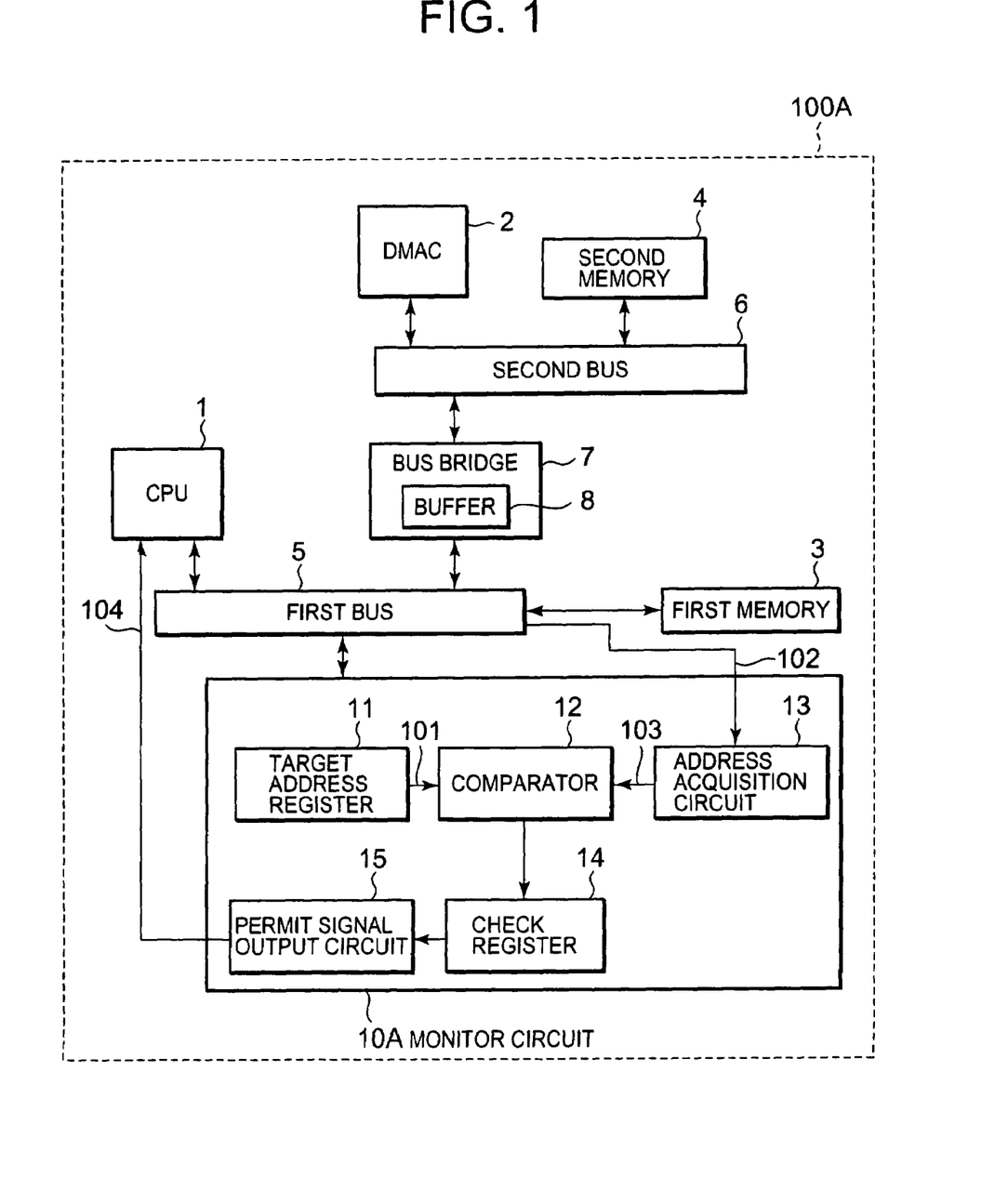
FIG. 1 is a block diagram showing the structure of the microcomputer of the first embodiment of this invention.

The structure of the microcomputer 100A is described in detail next while referring to FIG. 1. FIG. 1 is a block diagram showing the structure of the microcomputer 100A of the first embodiment of this invention. The microcomputer 100A of the first embodiment includes a CPU 1, a DMAC 2, a first memory 3, a second memory 4, a first bus 5, a second bus 6, a bus bridge 7, and a monitor circuit 10A.

The CPU 1 connected via the first bus to the first memory 3 acquires (reads) data from the first memory 3, or transfers (writes) data onto the first memory 3. Or the CPU 1 reads and executes the program written in the first memory 3. The first bus 5 connects via the bus bridge 7 to the second bus 6. In other words, the microcomputer 100A contains a first bus 5 and a second bus 6 showing a hierarchical structure. The DMAC 2 and the second memory 4 are connected to the second bus 6. The microcomputer 100A is preferably an I-C chip mounted on the same chip as the CPU. Either one of the bus bridge 7, the second bus 6, the DMAC 2, first memory 3 or the second memory 4 may be mounted outside the chip where the CPU 1 is mounted.

The DMAC 2 controls the transfer of data between the first memory 3 and the second memory 4. Or, starts the DMA transfer in response to a command from the CPU 1, and stops the DMA transfer when the transfer to the address specified by the CPU 1 is completed. Here, the DMA transfer signifies the operation to write data on the second memory 4 onto the first memory 3. The DMAC of the related art makes a transfer complete acknowledgement by way of an interrupt signal from the CPU 1 when DMA transfer is completed. However the DMAC 2 in this embodiment does not output this type of interrupt signal. The example in this embodiment described the DMAC 2 controlling the DMA transfer between the second memory 4 and the first memory 3. However, the DMAC 2 may also be an I/O device for controlling the input and output of data between an external communication device (for example a network, Universal Asynchronous Receiver Transmitter (UART), Universal Serial Bus (USB)) and the first memory 3.

The bus bridge 7 includes a buffer 8 for transfer by FIFO. Data transferred via the second bus 6 is first stored temporarily in the buffer 8 within the bus bridge 7, and then stored via the first bus 5 into the first memory 3.

The first bus 5 and the second bus 6 are internal buses in the CPU including address buses, data buses, and control buses. The CPU 1 and the DMAC 2 output the address data 102 and the transfer data (read data, write data), various types of commands (read, write) via the first bus 5 and the second bus 6. In other words, the CPU 1 operates to perform a CPU bus cycle on the first bus 5 and the second bus 6. The DMAC 2 operates to perform a DMA bus cycle on the first bus 5 and the second bus 6. These buses may be common lines or may mutually separate dedicated lines.

The monitor circuit 10A includes a target address register 11 for storing the target address 101, a comparator 12, an address acquisition circuit 13, a check register 14, and a permit signal output circuit 15. The CPU 1 sets the target address 101 into the target address register 11 before outputting a command to the DMAC2 to start DMA transfer, or during output of the command. The target address 101 here is the address in the first memory 3 whose DMA transfer must be completed at the point in time that the CPU 1 accesses the first memory 3. The target address 101 is in other words, the final address among the transfer destination addresses in consecutive DMA transfers specified from the CPU 1. When the transfer destination address in consecutive DMA transfers is for example from 0 address to 100 address, then the 100 address is set as the target address 101. An address other than the final address in the consecutive DMA transfer can be set as the target address 101 if it prevents the CPU 1 from accessing data prior to DMA transfer. If the transfer destinations in consecutive DMA transfer for example are from 0 address to 100 address, and the CPU 1 is reading data in order from the 0 address to 100 address, then if the DMA transfer ends at address 81 or later, an 80 address can be set as the target address 101, up until the CPU 1 reads the address 80 data.

The address acquisition circuit 13 monitors the first bus 5, and acquires the address data 102 transferred to the address bus on the first bus 5. The address bus and the data bus in this case may be a common bus or may be respective dedicated buses. However in the case of a common bus, the address acquisition circuit 13 acquires the address data 102 from the first bus 5 according to a specified address cycle. The address cycle here is a code showing that the first bus 5 is used as the address bus. The first bus serves as the address bus while this address cycle has been output.

The address acquisition circuit 13 outputs the address based on address data 102, as acquisition address 103, to the comparator 12. The address acquisition circuit 13 for example outputs the address data 102 as the acquisition address 103 to the comparator 12. Or, the address acquisition circuit 13 may use the address data 102 to generate the acquisition address 103, and output it to the comparator 12. When the transfer data is for example, burst data then the address acquisition circuit 13 increments the address data 102 according to the burst length, and outputs that address value to the comparator 12 as the acquisition address 103.

The comparator 12 compares the target address 101 and the acquisition address 103. If these two addresses are same, then the comparator 12 raises a flag in the check register 14 (sets a "1" for example in the check register 14).

The permit signal output circuit 15 monitors the check register 14, and outputs a permit signal 104 to the CPU 1 if the value that is shown in the check register 14 changes from a "0" to a "1". This permit signal 104 allows the CPU 1 to access the DMA transfer destination region in the first memory 3. This permit signal 104 may also be set as an interrupt signal. In that case, the CPU 1 executes interrupt processing in response to the permit signal 104 and, stops processing currently being executed, and accesses the region for DMA transfer to the first memory 3.

In the microcomputer 10A of this invention as described above, the CPU 1 read process can be performed without overtaking the DMA write process because the monitor circuit 10A confirms that data write via DMA transfer onto the first memory 3 has been completed. Moreover, the applicable data can be read after the CPU 1 confirms that data writing via DMA transfer is complete, even if the bus possesses a configuration with a hierarchical structure with delay elements. In other words, a shift can be correctly made from DMA transfer to access via the CPU 1, and each process correctly executed without the CPU 1 reading incorrect data, even in structures where data sent via DMA transfer is sent to the first memory 3 after a delay. The bridge 7 connected to the second bus 6 is here connected to the first bus 5, but this invention is not limited to this method, and the second bus 6 may show a hierarchical structure to the first bus 5. The second bus 6 is a bus connected via some type of delay factor to the first bus 5 but this invention is not limited to this method.

Operation

Figure 2:
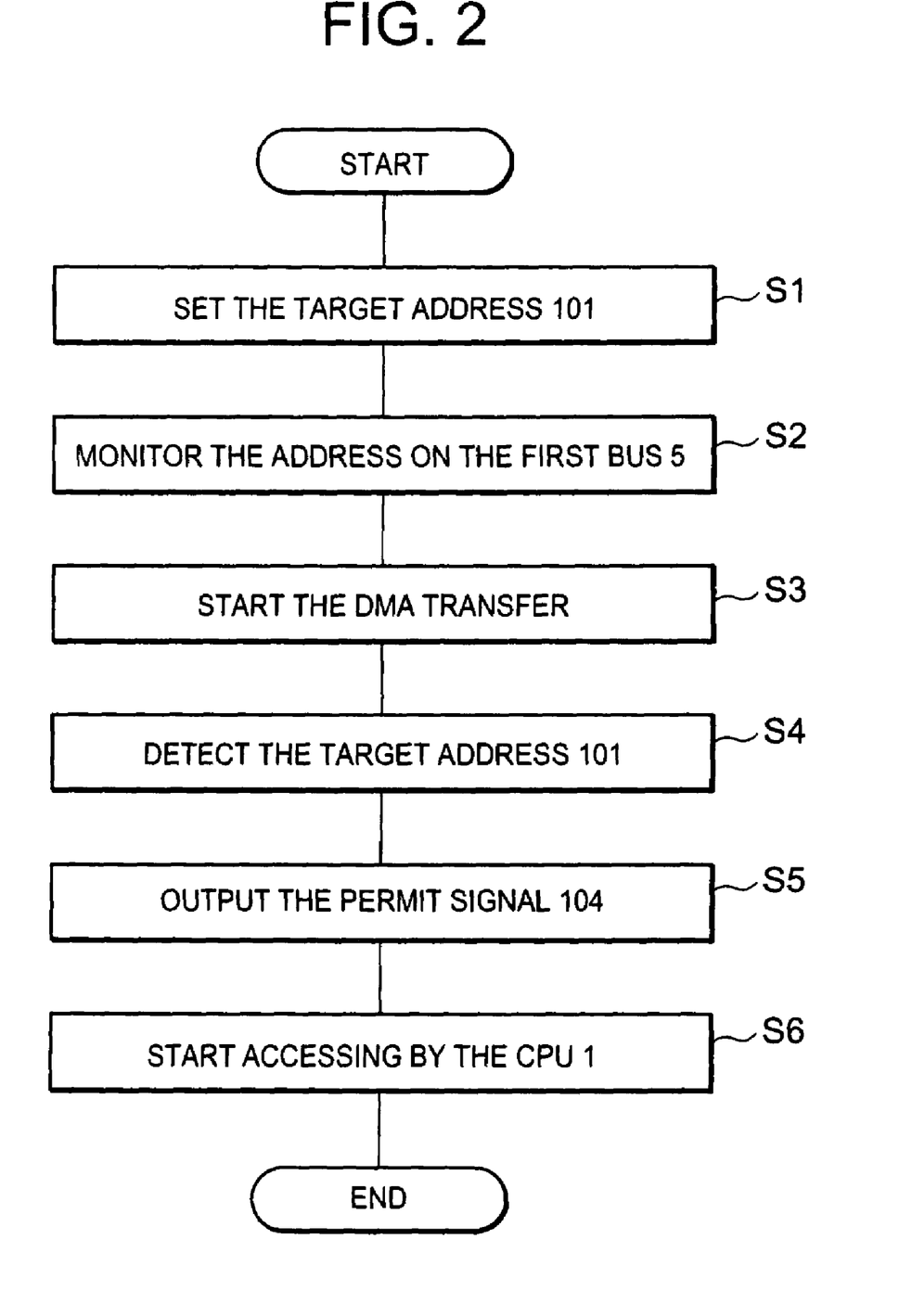
FIG. 2 is a flow chart showing the microcomputer operation in this invention.
Figure 3A:
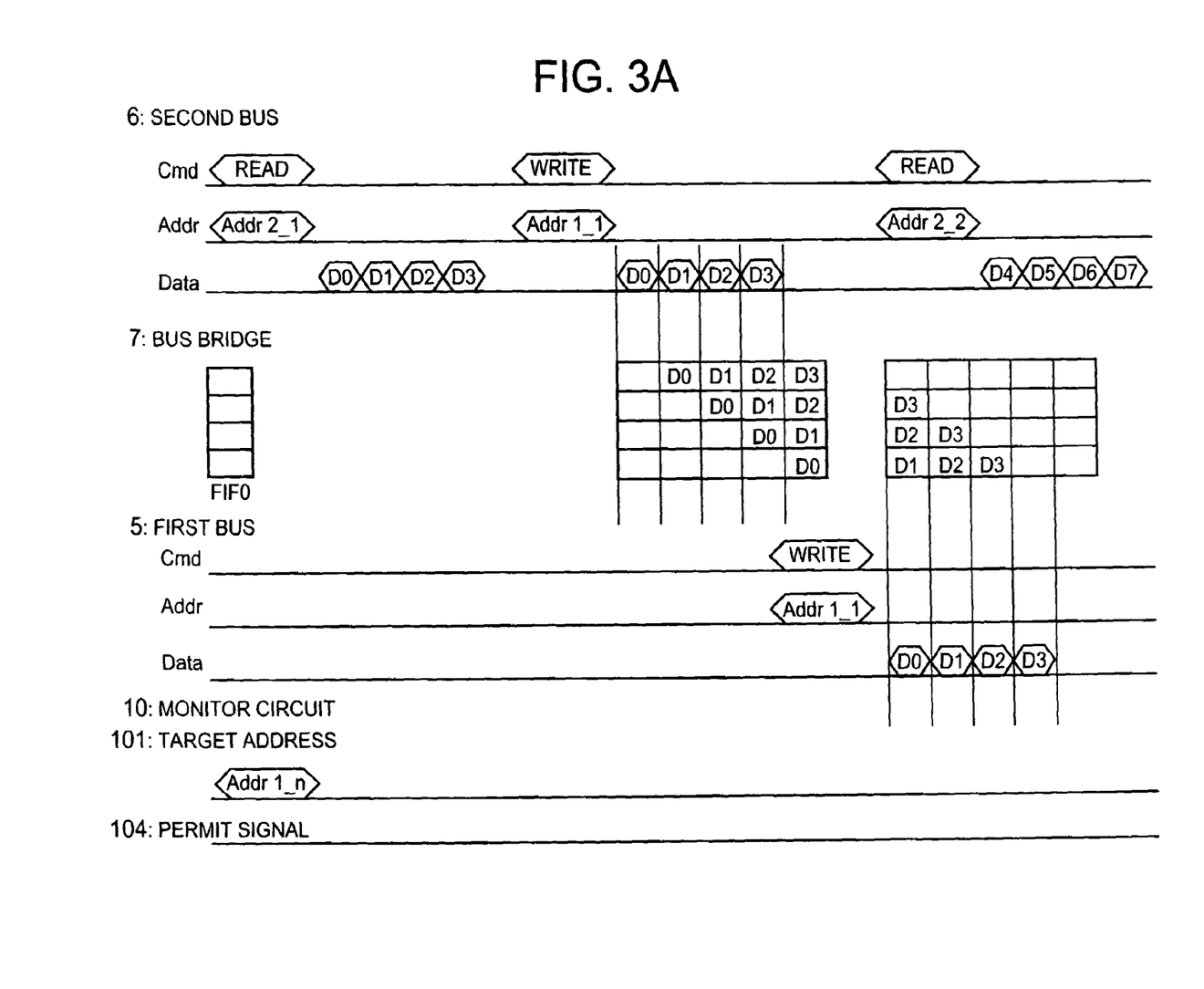
FIG. 3A is a timing chart showing the target address monitor operation and the DMA transfer operation in the microcomputer operation in this invention.
Figure 3B:
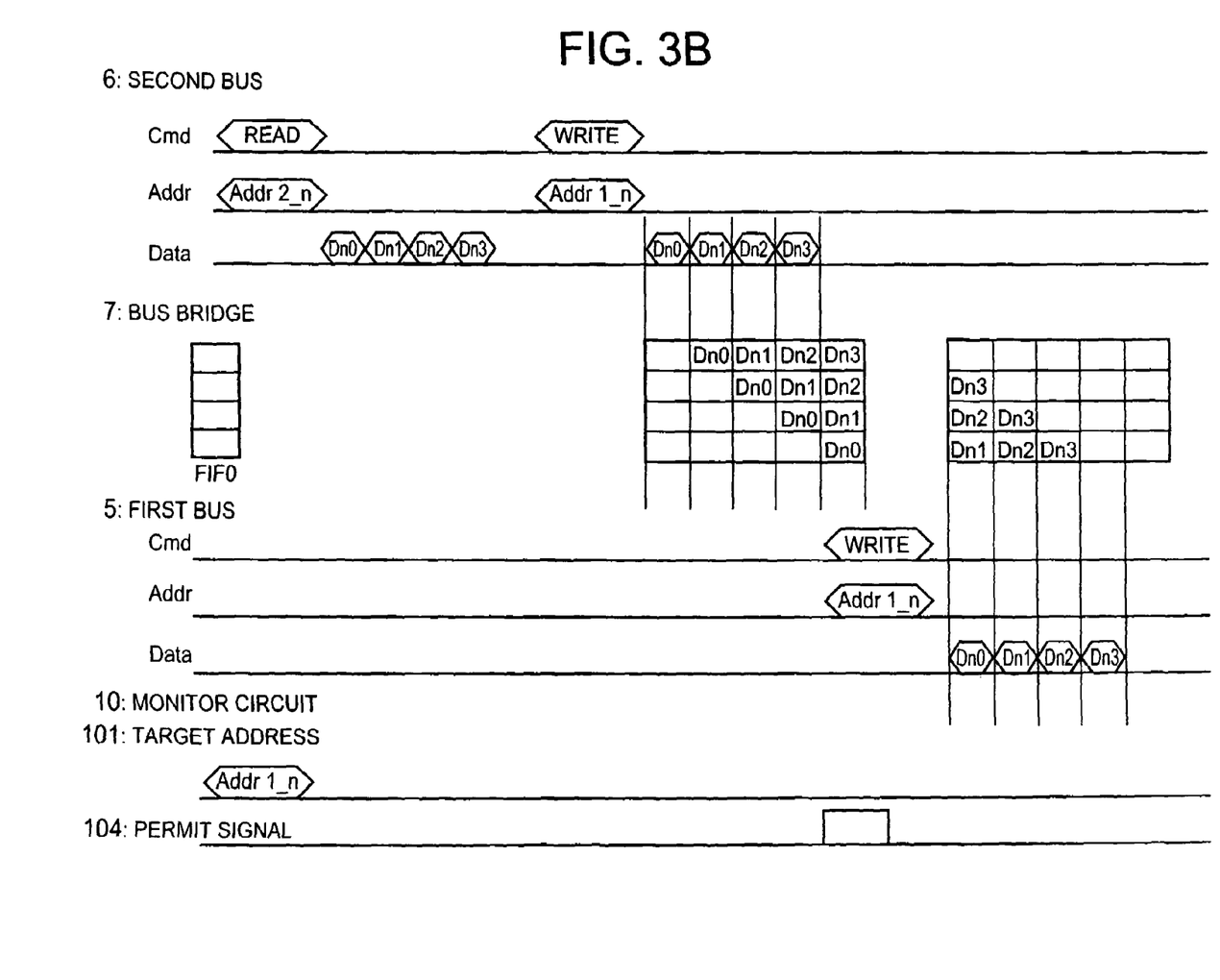
FIG. 3B is a timing chart showing the target address monitor operation and the DMA transfer operation in the microcomputer operation in this invention.

The operation of the microcomputer 100A of this invention is described in detail next while referring to FIG. 1 through FIG. 3B. FIG. 2 is a flow chart showing the operation in the microcomputer 100A from DMA transfer to the CPU 1 accessing the first memory 3. FIG. 3A and FIG. 3B are timing charts showing the target address monitor operation and the DMA transfer operation in the microcomputer 100A of this invention. FIG. 3A is a timing chart showing the DMA transfer operation from the transferring of the initial data D0-D4 from the second bus 6 to the first bus 5 in a consecutive DMA transfer; and the operation for setting the target address 101 during the start of DMA transfer as well as the operation for monitoring the target address. FIG. 3B is a timing chart showing the DMA transfer operation from the transferring of the final data Dn0-Dn4 from the second bus 6 to the first bus 5 in consecutive DMA transfer, as well as the process from the address monitoring operation to the detection of the target address. In the DMA transfer here, the operation where the data Dn0-Dn4 sent by DMA transfer from the second memory 4 is written onto the first memory 3 and the CPU 1 reads the data Dn0-Dn4 written into the first memory 3 is described.

Prior to the command for DMA transfer, the CPU 1 sets the target address 101 into the target address register 11 via the first bus 5 (step S1). The CPU 1 here as a target address, sets the address (Addr1_*n*) as the final destination address for the DMA transfer (See FIG. 3A.) The monitor circuit 10A where the target address 101 is set, starts monitoring for the address data 102 on the first bus 5 (step S2). In step S2, the address acquisition circuit 13 acquires the address data 102 on the first bus 5 at the specified timing and, outputs the acquisition address 103 based on the address data 102 to the comparator 12. The comparator 12 compares the target address 101 in the target address register 11 with the acquisition address 103, and based on those results, updates the check register 14. Even before the target address 101 has been set, the comparator 12 may also constantly compare the target address 101 (before it was set), with the acquisition address 103.

When setting the target address 101, the CPU 1 outputs a DMA transfer command to the DMAC2 to start DMA transfer. The DMA2 receives the transfer start command and starts the DMA transfer (step S3). The DMA transfer and the target address monitor operation in the microcomputer 100A are described in detail next while referring to FIG. 3A and FIG. 3B. The DMAC 2 here transfers the data D stored in the addresses Addr2_1 through Addr2_*n* in the second memory 4, to the addresses Addr1_1 through Addr1_*n* in the first memory 3. In this embodiment, a DMA transfer example is described where the four data are read out and written for one address.

The DMAC2 outputs a read command along with a read target address (Addr2_1) via the second bus 6, to the second memory 4 and, acquires the data D0-D3 from the region matching the address (Addr2_1) in the second memory 4. The DMAC2 next transfers the write command along with the write destination address (Addr1_1) via the second bus 6, and transfers the data D0-D3. The address (Addr1_1) in the first memory 3 for the write command and the write destination address are transferred via the bus bridge 7 to the first bus 5. In this case, the write command and the address (Addr1_1) are respectively transferred to the first bus via a buffer (buffer connecting respectively to a command bus, and an address bus) not shown in the drawing for the bus bridge 7. Or, the data D0-D3 is transferred by FIFO to the first bus 5 via the buffer 8 on the bus bridge 7.

The address acquisition circuit 13 reads the address (Addr1_1) transferred to the first bus 5 as the address data 102, and outputs it as acquisition address 103 to the comparator 12. The comparator 12 compares the target address 101 (Addr1_n) with the acquisition address 103 (Addr1_1) and since these a mismatch, holds the check register 14 at "0" without rewriting it.

In the continuation of the data D0-D3 transfer, the DMAC2 next DMA transfers the data from address (Addr2_2-Addr2_n-1) from the second memory 4 in the same way to the address (Addr1_2-Addr1_n-1) in the first memory 3. The comparator 12 then compares the target address 101 (Addr1_n-1) in the same way, with the acquisition address 103 (Addr1_2-Addr1_n) and, holds the check register 14 at "0" without rewriting it based on the comparison results (mismatch).

The DMAC2 next executes the final DMA transfer in the consecutive DMA transfer based on the DMA transfer command from the CPU11. The DMA2 in other words, executes in the same way, a DMA transfer of the data Dn0-Dn3 from the address (Addr2_n) in the second memory 4, to the address (Addr1_n) in the first memory 3. The comparator 12 in this case, compares the target address 101 (Addr1_n) in the same way, with the acquisition address 103 (Addr1_n) and due to a mismatch of the two addresses, updates the check register 14 to a "1". In other words, the monitor circuit 10A detects addresses matching the target address 101 on the first bus 5 (step S4).

When the target address 101 is detected on the first bus 5, the monitor circuit 10A outputs a pulse signal as a permit signal 104 to the CPU 1. The CPU 1 acquires access rights from this permit signal 104 to the region matching the addresses Addr1_1 through Addr1_n in the first memory 3. The CPU 1 in this embodiment obtains access permission by way of an edge trigger in response to the permit signal 104; however a level trigger may of course also be used. If the permit signal 104 is set in the system as an interrupt signal, then the CPU 1 stops the current processing in response to the permit signal 104, accesses the addresses Addr1_1 through Addr1_n in the first memory 3 and, reads out the data D0-DN4 stored by DMA transfer (step S6).

As described above, a flag is raised in the check register 14 (a "1" is set in the check register 14) during monitoring of addresses on the first bus 5 between the first memory 3 and the CPU 1, and writing in the transfer destination address (target address 101) at the end of DMA transfer in the microcomputer 100A of this invention. The CPU 1 can confirm that data transfer (DMA transfer) is definitely complete by receiving the permit signal 104 in response to the rewriting of the check register 14. Consequently, the CPU 1 can access (CPU read) the first memory 3, without overtaking the DMA transfer (DMA write).

In this invention, the results from monitoring the first bus 5 are recorded in the check register 14; or a register may be formed in the monitor circuit 10A for holding information that the permit signal 104 was output. Or, just the check register 14 may be updated without outputting the permit signal 104. The CPU 1 can therefore confirm whether or not DMA transfer was completed by referring to the check register 14 (or the register where outputting of permit signal 104 was recorded). The CPU 1 for example may check the update status of the check register 14 in reply to the permit signal 104. Or the CPU 1 may check the update status of the check register 14 in reply to an interrupt command output from the DMAC2 after completion of the DMA transfer, and access the region relating to the DMA transfer to the first memory 3 in response to this update status. In this case, the CPU 1 can read-out the value in the check register 14 via the first bus 25 in response to the interrupt command output from the DMAC2 and await confirmation that DMA transfer is complete before accessing the first memory 3. More specifically, the CPU 1 reads out the value in the check register 14 at the specified count (number of times) and timing until confirming that DMA transfer is complete by receiving the interrupt command, and can in this way confirm the end of DMA transfer even without receiving the permit signal 104. In other words, a conventional DMAC that outputs an interrupt command after completion of DMA transfer can be used as DMAC2 according to this invention. In this embodiment the reading or writing of the applicable register by the CPU 1 resets the check register 14. Also, when there is one target register 101 set in this embodiment, then a check register-clear register may be installed in the monitor circuit 10A, to reset the applicable register after it was updated.

In the method for executing CPU read by an interrupt from the DMAC as shown in FIG. 3B, the CPU1 starts reading out the scheduled data Dn0-Dn3 written in the first memory 3, in response to the interrupt command output from the DMAC2 when the data Dn0-Dn3 was transferred to the second bus 6. At this time, the data Dn0-Dn3 is present within the bus bridge 7 (buffer 8), when the CPU 1 for example is reading data on the address Addr1_n in the first memory 3. The CPU 1 therefore reads data from the first memory 3 that is different from the desired Dn0-Dn3 data. However in this invention, the CPU 1 accesses the addresses Addr1_1-n in the first memory 3, after the target address 101 (here is Addr1_n) on the first bus 5 was transferred. The CPU1 can therefore access the first memory 3 after the data Dn0-Dn3 was written. The CPU 1 in other words is certain to read out the data after DMA transfer was performed.

Second Embodiment

Figure 4:
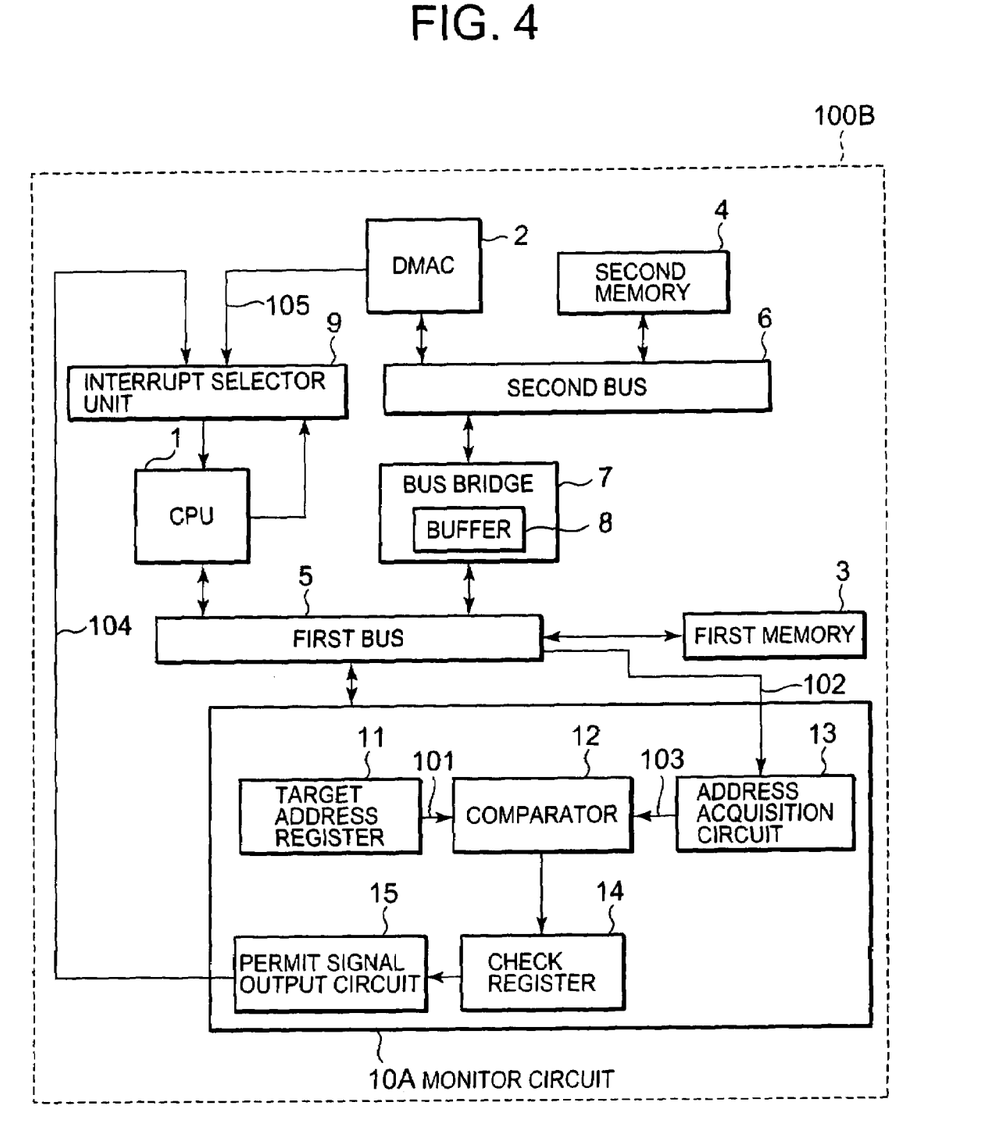
FIG. 4 is a block diagram showing the structure of the microcomputer in the second embodiment of this invention.

The microcomputer for the second embodiment of this invention is described next while referring to FIG. 2 through FIG. 4. In the microcomputer 100B of this second embodiment, control from the DMAC2 or from the monitor circuit 10A determines the timing that the CPU 1 accesses the first memory 3.

Structure

The structure of the microcomputer 100B is described next in detail while referring to FIG. 4. FIG. 4 is a block diagram showing the structure of the microcomputer 100B of the second embodiment. In addition to the microcomputer 100A structure of the first embodiment, the structure of the microcomputer 100B of the second embodiment contains an interrupt selector unit 9. Also, when DMA transfer is completed, the DMAC2 of this embodiment outputs a permit signal 105 to allow the CPU 1 to access the first memory 3. This permit signal 105 may be set as the interrupt command. In that case, the CPU 1 that received the permit signal 105, executes the interrupt, accesses the region in the DMA transfer for the first memory 3 and then reads out the data written by the DMA transfer.

A permit signal 104 output from the permit signal output circuit 15 and a permit signal 105 output from the DMAC2 are input to the interrupt selector unit 9, and the interrupt selector unit 9 then outputs either of these signals (104 or 105) to the CPU 1. These permit signals input from the interrupt selector unit 9 permit the CPU 1 to access (CPU read) the region in the first memory 3 relating to the DMA transfer. The CPU 1 is here set in advance so that the interrupt selector unit 9 will select either the permit signal 104 or the permit signal 105. More specifically, if the interrupt selector unit 9 is set to select a permit signal 105, then the monitor circuit 10A is set so as not to output the permit signal 104. Methods to prevent the monitor circuit 10A from outputting a permit signal 104, include a method where the CPU 1 does not set a target address 101 in the target address register 11; and a method that prevents outputting the permit signal 104 by setting the check register 14 to disable. Also, when the interrupt selector unit 9 is set to select the permit signal 104, then the interrupt selector unit 9 is set in advance so as not to transfer the permit signal 105 from the DMAC2 to the CPU 1.

Operation

The operation where DMA transfer writes data from the second memory 4 into the first memory 3; and the CPU then reads the data written in the first memory 3, is described next while referring to FIG. 2 through FIG. 4.

The operation in the steps S1 through S3 is the same as in the first embodiment so a description is omitted here. In step S3, when the DMAC2 transfers the final data Dn0-Dn3 in the consecutive DMA transfer to the second bus 6, the DMAC2 outputs a permit signal 105 to the interrupt selector unit 9. If the interrupt selector unit 9 is here set to select the permit signal 104, then it remains in standby, awaiting input of the permit signal 104, and does not accept the permit signal 105 even if it was input. In step S5, the monitor circuit 10A detects the target address on the first bus 5, and when the permit signal 104 is output, the interrupt selector unit 9 outputs this permit signal 104 to the CPU 1. In step S6, in response to the permit signal 104, the CPU 1 is allowed access to the addresses Addr1_1 through Addr1_n of the DMA transfer destination for the first memory 3. However, when the interrupt selector unit 9 is set to select the permit signal 105, it outputs the permit signal 105 to the CPU 1 immediately after that permit signal 105 was input to the interrupt selector unit 9. In step S6, in response to the permit signal 105, the CPU 1 is allowed access to the addresses Addr1_1 through Addr1_n of the DMA transfer destination for the first memory 3. The step of setting the target address 101 in step S1 is omitted when the monitor circuit 10A is set to select the permit signal 105.

When reading image data made up of multiple data, the CPU 1 usually reads out the data in sequence from the lead (beginning) address. Even after starting access to the first memory 3 based on the permit signal 105 received from the DMAC 2, the CPU 1 reads out the data starting from the initial data whose DMA transfer is assumed to have already finished. There in DMA transfers where large amounts of data such as image data is transferred, the possibility that reading by the CPU 1 of the first memory 3 will overtake writing by the DMA is extremely low even if the transfer is delayed by the buffer 8. In this case, the process of setting the target address 101 can be omitted by selecting the permit signal 105 for granting access. Also, when executing this type of data DMA transfer, rather than the CPU 1 accessing the first memory 3 in response to the permit signal 104, CPU read via access in response to permit signal 105 can be executed without awaiting transfer to the target address for the first bus 105 so data can be quickly read. When for example setting the permit signals 104, 105 as interrupt commands to execute CPU read, and then CPU read performed in response to the permit signal 105 can read out the DMA-transferred data in a shorter time than when using the permit signal 104. Moreover, the ability to select the permit signal 104 and the permit signal 105, allows using the DMAC of the related art as the DMAC2 to output the permit signals to the CPU 1 after DMA transfer is completed. In other words, the microcomputer 100B of this invention can be easily utilized in existing systems since the DMAC of the related art can be utilized without changes.

The functions of the interrupt selector unit 9 may be integrated internally into the CPU 1. The permit signal 104 and the permit signal 105 are in this case directly input to the CPU 1 as signals for discrimination and selection. Measures allowing the CPU 1 to judge the permit signal 104 and the permit signal 105 may for example be a structure where the permit signal 104 and the permit signal 105 are input to the CPU 1 via dedicated lines, or a structure where identification information is attached to the permit signal 104 and the permit signal 105 to allow respectively identifying them, and then inputting the permit signal to the CPU 1 via a common line.

Third Embodiment

The microcomputer for the third embodiment of this invention is described next while referring to FIG. 5 through FIG. 6B. The example in the first and second embodiments described one DMA transfer. However the example in the third embodiment, describes a microcomputer 100C that performs multiple DMA transfers without a reversal in the CPU access. In contrast to the microcomputer 100A of the first embodiment, the microcomputer 100C of this embodiment contains multiple DMAC 2.

Structure

Figure 5:
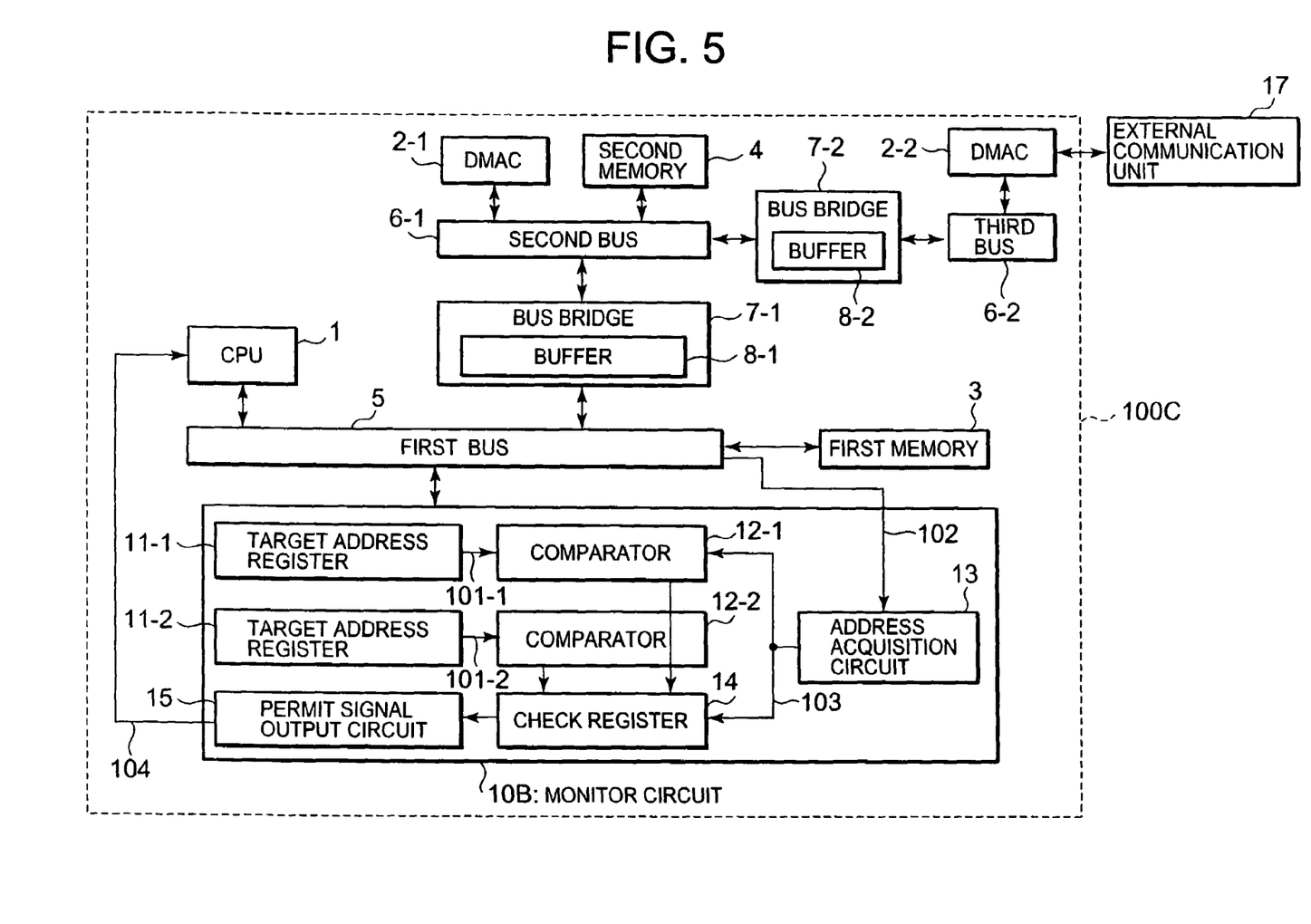
FIG. 5 is a block diagram showing the structure of the microcomputer in the third embodiment of this invention.

The structure of the microcomputer 100C is next described in detail while referring to FIG. 5. FIG. 5 is a block diagram showing the structure of the microcomputer 100C of the third embodiment. The microcomputer 100C of the third embodiment contains a DMAC2-1 and DMAC2-2 for controlling respectively different DMA transfers. Hereafter, the same numbers are attached to reference numerals for signals and structural elements corresponding respectively to DMAC2-1 and DMAC2-2. Also, structures with identical reference numerals (including reference numerals without added numbers) on the first and second embodiments indicate the same operation so a description is omitted.

The microcomputer 100C includes a CPU 1, multiple DMAC2-1, 2-2, a first memory 3, a second memory 4, a first bus 5, a second bus 6-1, a third bus 6-2, the bus bridges 7-1, 7-2, and a monitor circuit 10B. The first bus 5 is connected via a bus bridge 7-1 to a second bus 6-1. The DMAC 2-1 and the second memory 4 connect to the second bus 6-1. The third bus 6-2 connects via the bus bridge 7-2 to the second bus bridge 6-1. The DMAC 2-2 connects to the third bus 6-2. The DMAC 2-1 controls the DMA transfer between the first memory 3 and the second memory 4; and the DMAC 2-2 controls the DMA transfer between the first memory 3 and the external communication unit 17 (for example, the network, UART, USB) installed outside the microcomputer 100C. The bus bridges 7-1, 7-2 respectively include a buffer 8-1 and 8-2.

The monitor circuit 10B in this embodiment includes multiple target address registers 11-1, 11-2 and, comparators 12-1, 12-2 connected respectively to the corresponding target address registers 11-1, 11-2. The address acquisition circuit 13 is connected in common with the comparators 12-1 and 12-2, and outputs an identical acquisition address 103 to these comparators. The target addresses 101-1, 101-2 corresponding to the DMAC2-1, 2-2 are set in the respective target address registers 11-1 and 11-2. The comparators 12-1 and 12-2 compare the acquisition address 103 with the target addresses 101-1, 101-2 within the corresponding target address registers 11-1 and 11-2, and raises a flag in the check register 14 (sets a "1" in the check register 14).

Figure 6A:
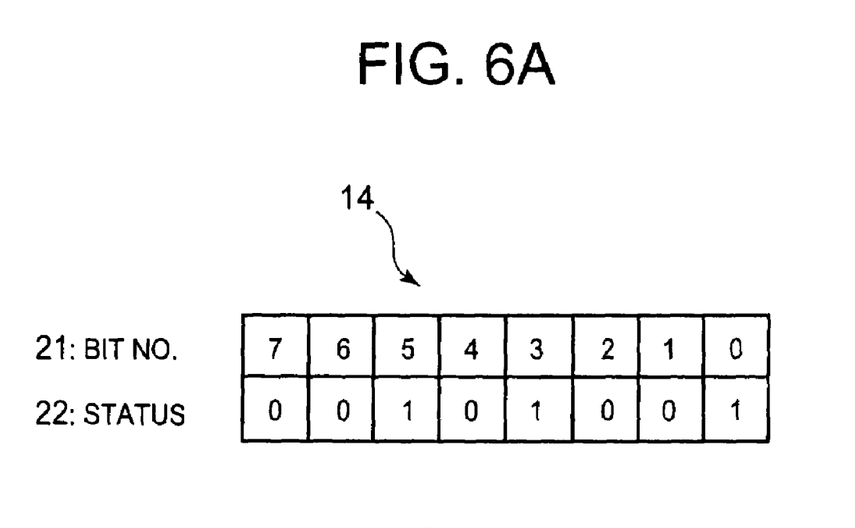
FIG. 6A is a drawing showing the structure of the check register for the third embodiment of this invention.
Figure 6B:
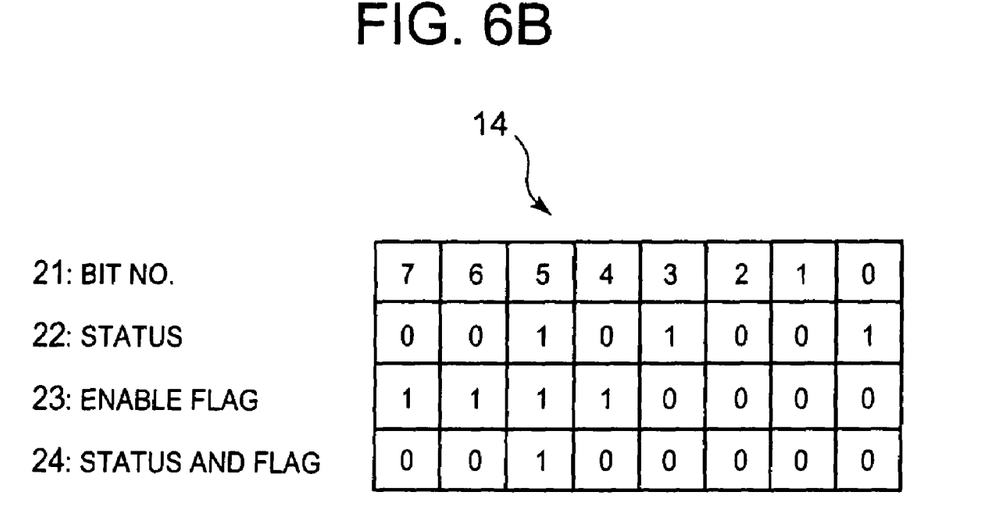
FIG. 6B is a drawing showing the structure when the enable flag for the check register was applied in the third embodiment of this invention.

The check register 14 here includes a region (bit No. 21 and status 22) linked to each target address 101 and comparator 12 as shown in FIG. 6A. The example in FIG. 6A shows the structure of a check register 14 capable of recording comparison results from the eight comparators 12. The comparator 12 updates the corresponding status 22 according to the respective comparison results. When the target address 101 matches the acquisition address 103, the comparator 12 sets a "1" in the status 22 of the bit No. 21 corresponding to itself (comparator 12), and sets a "0" if these are not same. A "0" is always set in the status 22 of the check register 14.

The comparators 12-1 and 12-2 are here set with a "0", "1" in the respective bit No 21. The comparator 12-1 compares the acquisition address 103 with the target address 101 and if both are same, updates a "1" in the status 22 corresponding to "0" of bit No. 21.

The permit signal output circuit 15 monitors each of the status 22 in the check register 14 and if even one of the status 22 values are a "1", outputs the permit signal 104 to the CPU 1. Here, when either of the "0" or "1" of bit No. 21 corresponding to the respective comparators 12-1 and 12-2, or both the status 22 are updated to a "1", then the permit signal output circuit 15 outputs a permit signal 104.

In response to this permit signal 104, the CPU 1 acquires the status 22 and the bit No. 21 within the check register 14 via the first bus 5. The bit No. 21 (comparator 12) and the DMA transfer (DMAC2) are set linked to each other so that the CPU 1 can check what DMA transfer was completed via the acquired bit No. 22 and the status 22. When the bit No 21 is "0" for the acquired status 22 for example is "1" then the DMAC 2 permits the CPU 1 access to the region of the first memory 3 relating to that DMA transfer. Or the status 22 is reset to all zeroes "0" by read or write of the applicable register, the same as for the check register 14 of the first embodiment. This result is also the same in the other embodiments.

The microcomputer 100C of this invention with the structure described above can therefore monitor the multiple target addresses 101 corresponding to the multiple DMA transfers, and based on those monitored results, can check that each DMA transfer is complete, and allow the CPU 1 to start accessing the first memory 3.

In this embodiment, the permit signal 104 is not linked to each DMA transfer so the CPU 1 can check the contents of the check register 14 in response to the permit signal 104 and identifies the region that can be accessed. The permit signal 104 may however be linked to each DMAC2 (target address 101). In that case, the CPU 1 knows from the permit signal 104 which DMA transfer has been completed, so that the process of checking the check register 14 can be omitted. Methods for linking the permit signal 104 with the DMAC2 include a method for outputting a permit signal 104 via a dedicated line linked to the bit No. 21, and a method for attaching identification information such as for the bit No. to the permit signal 104 and outputting the permit signal 104.

In this embodiment, the CPU 1 acquires the value for the check register 14 in response to a permit signal 104. However, the CPU 1 may acquired the value for the check register 14 in response to a permit signal (for example, an interrupt command output to the CPU when the DMA transfer is completed) output from the DMAC2. The CPU 1 in this case, reads out the value for the check register 14 via the first bus 5 in response to a permit signal output from the DMAC2 and, waits until completion of the DMA transfer has been confirmed before accessing the first memory 3. The CPU 1 for example reads out values in the check register 14 at the specified timing and the specified count in response to an interrupt command from the DMAC2. When the CPU 1 confirms that status 22 is "1", it is allowed access to the region relating to the DMA transfer linked to the bit No. 21 corresponding to that status 22. In this case, no permit signal output circuit 15 is required but in some cases the status 22 in the check register 14 has still not been updated right after acquired the permit signal from DMAC2 so that the check register 14 must be accessed until the status 22 has been updated.

This embodiment moreover may be combined with the second embodiment. In other words, an interrupt selector unit 9 may be added to this third embodiment. The DMAC2-1, 2-2 in this case respectively output permit signals 105 to the CPU 1 when the DMA transfer is completed, the same as in the second embodiment. The permit signal to select at each DMA transfer is set in the interrupt selector unit 9, and the permit signal to input to the CPU 1 is selected based on this setting.

In this embodiment, an unused comparator 12 can be set by utilizing the enable flag 23 in the check register 14. FIG. 6B is a drawing showing the structure when an enable flag 23 was added to the check register 14 structure. In this case, a "1" is set in the enable flag 23 of the bit No. 21 corresponding to the comparator 12 being used, and a "0" is set in the enable flag 23 corresponding to the unused comparator 12. The permit signal output circuit 15 monitors the logic sum 24 of the status 22 and the enable flag 23 (instead of the status 22) and outputs a permit signal 104 based on this updated logic sum 24 (updated to a "1"). Or, in this case, the CPU 1 acquires the bit No. 21 and the logic sum 24 according to the permit signal 104, and executes the access process according to that logic sum. For example when one must select the permit signal 105 from the DMAC 2 as in the second embodiment, then the comparator 12 relating the applicable DMA transfer can be disabled by setting the enable flag 23 to "0" to prohibit output of the permit signal 104. Or, the enable flag 23 can be set to "0" after starting CPU 1 access based on the permit signal 104 or 105, to prohibit output of the permit signal 104 without resetting the target address register 11 corresponding to the applicable DMA transfer.

Setting the enable flag 23 as described above, allows controlling output of the permit flag 104, and determines use or non-use of the previously set multiple target addresses 101. The target address 101 must be updated to another address or reset in order to set the target address 101 to non-use, however these tasks are unnecessary if limits on use are set with the enable flag 23. Savings can therefore be made in the power consumption and the time required updating the target address 101.

Other than the process of the interrupt selector unit 9 selecting a permit signal and the process of checking the check register 14 via the CPU 1 input with a permit signal 104 (105), the operation of this embodiment is the same as the first and second embodiments so a description of redundant sections is omitted here. The example in this embodiment described two DMAC2, needless to say however this invention is not limited to this quantity. The bridge 7-2 connecting the third bus 6-2 is connected to the second bus 6-2 however this invention is not limited to this and the third bus may show a hierarchical structure to the first bus, of if the third bus 6-2 is a bus connecting to the first bus 25 via some kind of delay factor then this invention is not limited to this connection.

Fourth Embodiment

Figure 7:
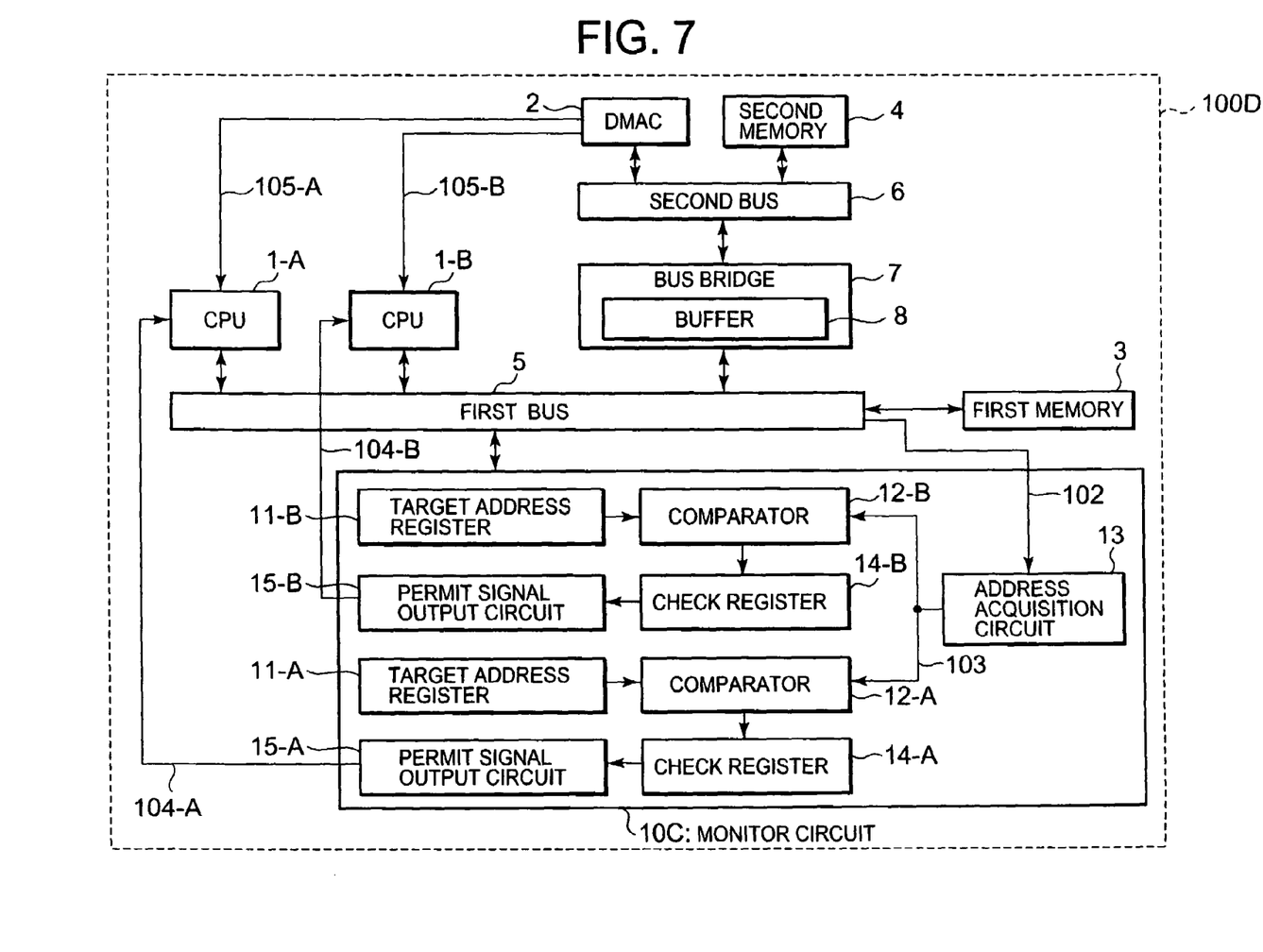
FIG. 7 is a block diagram showing the structure of the microcomputer in the fourth embodiment of this invention.

The microcomputer of the fourth embodiment this invention is described next while referring to FIG. 7. There was one CPU in the examples in the first through the third embodiments however the microcomputer 100D of the fourth embodiment includes multiple CPU. In contrast to the microcomputer 100A of the first embodiment, the microcomputer 100D is a structure containing multiple CPU 1-A, 1-B.

Structure

The structure of the microcomputer 100D is described next in detail while referring to FIG. 7. FIG. 7 is a block diagram showing the structure of the microcomputer 100D of the fourth embodiment. The microcomputer 100D of the fourth embodiment contains two CPU1-A and 1-B that execute respectively different processing. The same numerals A, B are hereafter applied to identical structural elements corresponding respectively to the CPU1-A and 1-B. Structural elements with the same reference numerals (including reference numerals without added numerals) as the first and the second embodiments indicate the same operation so their description is omitted.

In this embodiment, the CPU1-A and 1-B connect to the first memory 3 via a common first bus 5. The monitor circuit 10C in this embodiment includes a target address register 11-A, a comparator 12-A, a check register 14A, and a permit signal output circuit 15-A for the CPU1-A; and a target address register 11-B, a comparator 12-B, a check register 14A, and a permit signal output circuit 15-B for the CPU1-B. The permit signal output circuits 15A, 15-B output the permit signals 104-A and 104-B via respectively different signal lines to the CPU1-A and CPU1-B. In other words, the monitor circuit 10C of this embodiment monitors the target address 101 in each CPU1, and outputs a permit signal 104 to each CPU1 based on the monitoring results. To reduce the circuit structure, the permit signal output circuits 15-A and 15-B may output the permit signals 104-A and 104-B on a common signal line. In this case, the permit signals 104-A and 104-B include information for identifying the source permit signal output circuit 15 that output the permit signal. The operation of each circuit making up each CPU 1 is identical to the operation in the first and second embodiments and therefore a description is omitted here.

The embodiment may be combined with the second embodiment. Namely, an interrupt selector unit 9 may be installed. In that case, the CPU1-A and CPU1-B are connected to a respective interrupt selector unit 9. The permit signal output circuits 150A and 15-B each output permit signals 104-A, 104-B to the interrupt selector unit 9 via respectively separate signal lines. However in order to reduce the circuit structure, the permit signal output circuits 15-A and 15-B may output the permit signals 104-A and 104-B via a common signal line. In that case, the permit signals 104-A and 104-B contain information for identifying the source permit signal output circuit 15 that outputs the permit signal. The DMAC2 outputs separate permit signals 105 to the CPU1-A and 1-B via the interrupt selector unit 9. This embodiment may also be combined with the third embodiment or in other words, multiple DMAC2 may be installed.

As described above, CPU access to each CPU1 is controlled so that CPU access does not overtake the DMA transfer, since the target address 101 set on each CPU1 can be monitored on the first bus 5, even in a structure containing multiple CPU1. The example for this embodiment described the case of one DMAC2 for purposes of simplicity in the explanation but this embodiment may be combined with the third embodiment. In other words, the CPU1-A and 1-B may each contain multiple target address registers 11 and comparators 12. The present embodiment may also include a multiple CPU structure applicable to this invention.

Although the invention has been described above in connection with several preferred embodiments thereof, it will be appreciated by those skilled in the art that those embodiments are provided solely for illustrating the invention, and should not be relied upon to construe the appended claims in a limiting sense. Moreover, this embodiment is set so that a permit signal 104 is output when the check register 14 (status 22) is "1", and a permit signal is not output when the check register 14 (status 22) "0". However this invention is not limited to this method and may be set so that a permit signal 104 is output when the check register 14 (status 22) is "0", and a permit signal 104 is not output when the check register 14 (status 22) is "1".

What is claimed is:

1. A data processing apparatus, comprising:
a first bus connected to a first memory;
a first Central Processing Unit (CPU) being accessible to the first memory via the first bus;
a first Direct Memory Access (DMA) controller being accessible to the first memory via the first bus; and
a monitor circuit connected to the first bus and monitoring addresses transferred on the first bus,
wherein the addresses transferred on the first bus are transmitted from the first DMA controller to the first memory via the first bus, and
wherein the first CPU accesses the first memory based on monitoring results by the monitor circuit, the monitoring results indicating whether a DMA transfer controlled by the first DMA controller has been completed.

2. The data processing apparatus according to claim 1, wherein the monitor circuit outputs a first permit signal when a monitor target address is transferred on the first bus, thereby indicating a completion of the DMA transfer, and
the first CPU accesses the first memory in response to the first permit signal.

3. The data processing apparatus according to claim 2, wherein the monitor circuit comprises:
a first target address register storing the monitor target address;
an address acquisition circuit acquiring the addresses transferred on the first bus;
a comparator comparing the address stored in the first target address register with the address acquired by the acquisition circuit; and
a first permit signal output circuit outputting the first permit signal when the address acquired by the acquisition circuit matches the address stored in the first target address register.

4. The data processing apparatus according to claim 3, wherein the monitor circuit further comprises:
a check register storing comparison results by the comparator, and
wherein the comparator updates the check register when the address acquired by the acquisition circuit matches the address stored in the first target address register, and
the first permit signal output circuit outputs the first permit signal in response to the updating of the check register.

5. The data processing apparatus according to claim 3, further comprising:
a second DMA controller being accessible to the first memory via the first bus, and
wherein the monitor circuit further comprises:
a second target address register storing the monitor target address linked to the second DMA controller, and
wherein the first target address register stores the monitor target address linked to the first DMA controller, and
wherein the first permit signal output circuit outputting the first permit signal when the address acquired by the acquisition circuit matches the address stored in the second target address register.

6. The data processing apparatus according to claim 3, further comprising:
a second CPU being accessible to the first memory via the first bus, and
wherein the monitor circuit further comprises:
a second target address register storing the monitor target address linked to the second CPU; and
a second permit signal output circuit outputting the second permit signal when the address acquired by the acquisition circuit matches the address stored in the second target address register, and
wherein the first target address register stores the monitor target address linked to the first CPU, and
wherein the second CPU accesses the first memory in response to the second permit signal.

7. The data processing apparatus according to claim 2, wherein the first CPU accesses a storage region of the first memory corresponding to the addresses transferred on the first bus in response to the first permit signal.

8. The data processing apparatus according to claim 2, wherein the first CPU accesses the first memory according to either the first permit signal or a second permit signal output from the first DMA controller.

9. The data processing apparatus according to claim 2, further comprising:
an interrupt selector unit receiving the first permit signal and a second permit signal output from the first DMA controller and selecting either the first permit signal and the second permit signal according to a select signal output from the first CPU, and
wherein the first CPU accesses the first memory based on a selection result by the interrupt selector unit.

10. A data processing apparatus, comprising:
a first bus connected to a first memory;
a first Central Processing Unit (CPU) being accessible to the first memory via the first bus;
a first Direct Memory Access (DMA) controller being accessible to the first memory via the first bus;
a second bus connected between the first bus and the first DMA controller; and
a monitor circuit connected to the first bus and monitoring addresses transferred on the first bus,
wherein the addresses transferred on the first bus are transmitted from the first DMA controller to the first memory via the first bus,
wherein the first CPU accesses the first memory based on monitoring results by the monitor circuit, and
wherein the monitor circuit monitors addresses output from the first DMA controller to the first bus via the second bus.

11. The data processing apparatus according to claim 10, wherein the second bus is connected to a second memory, and
the first DMA controller reads data stored in the second memory and transfers the read data to the first memory via the first bus and the second bus.

12. The data processing apparatus according to claim 11, further comprising:
a bus bridge connected between the first bus and the second bus,
wherein the bus bridge includes a buffer to store the read data temporarily.

13. A data processing apparatus, comprising:
a first bus;
a Direct Memory Access (DMA) controller coupled to the first bus and operative to perform a DMA bus cycle on the first bus;
a Central Processing Unit (CPU) coupled to the first bus and operative to perform a CPU bus cycle on the first bus; and
a monitor circuit coupled to the first bus and temporarily storing target address information to produce access information indicating that address information appearing on the first bus based on the DMA bus cycle is equal to the target address information, thereby signifying that the DMA bus cycle has been completed, the CPU being granted to perform the CPU bus cycle when the access information is produced.

14. The data processing apparatus according to claim 13, wherein the monitor circuit comprises:
a permit signal output circuit outputting a permit signal to the CPU when the access information is produced, and
wherein the CPU being granted to perform the CPU bus cycle based on the permit signal.

15. The data processing apparatus according to claim 14, wherein the monitor circuit further comprises:
a check register storing the access information, and
wherein the permit signal output circuit outputting the permit signal in response to a update of the check register.

16. The data processing apparatus according to claim 13, wherein the monitor circuit comprises:
a target address register storing the target address information;
a address acquisition circuit acquiring the address information appearing on the first bus; and
a comparator producing the access information.

17. The data processing apparatus according to claim 13, further comprising:
a second bus coupled between the first bus and the DMA controller, and
wherein the address information appearing on the first bus is output from the DMA controller to the first bus via the second bus.

18. The data processing apparatus according to claim 17, further comprising:
a bus bridge coupled between the first bus and the second bus, and
wherein the bus bridge temporarily stores data transferred from the second bus to the first bus.

19. The data processing apparatus according to claim 13, wherein the first bus is coupled to a memory, and
wherein the address information appearing on the first bus is transmitted from the DMA controller to the memory.

20. The data processing apparatus according to claim 19, wherein the CPU executes the bus cycle to access a storage region of the memory corresponding to the address information appearing on the first bus when the access information is produced.

* * * * *